United States Patent
Dudha et al.

(10) Patent No.: US 10,289,786 B1
(45) Date of Patent: May 14, 2019

(54) CIRCUIT DESIGN TRANSFORMATION FOR AUTOMATIC LATENCY REDUCTION

(71) Applicant: Xilinx, Inc., San Jose, CA (US)

(72) Inventors: Chaithanya Dudha, San Jose, CA (US); Shangzhi Sun, San Jose, CA (US); Ashish Sirasao, San Jose, CA (US); Nithin Kumar Guggilla, Hyderabad (IN)

(73) Assignee: XILINX, INC., San Jose, CA (US)

( * ) Notice: Subject to any disclaimer, the term of this patent is extended or adjusted under 35 U.S.C. 154(b) by 38 days.

(21) Appl. No.: 15/634,016

(22) Filed: Jun. 27, 2017

(51) Int. Cl.
*G06F 17/50* (2006.01)

(52) U.S. Cl.
CPC ........ *G06F 17/5054* (2013.01); *G06F 17/505* (2013.01); *G06F 17/5031* (2013.01); *G06F 17/5072* (2013.01); *G06F 2217/84* (2013.01)

(58) Field of Classification Search
CPC .................................................. G06F 17/5081
USPC ........... 716/134, 108, 105, 113, 136; 703/16
See application file for complete search history.

(56) References Cited

U.S. PATENT DOCUMENTS

| | | | | |
|---|---|---|---|---|
| 5,710,891 A * | 1/1998 | Normoyle | ............. | G06F 13/368 710/119 |
| 5,896,300 A * | 4/1999 | Raghavan | ........... | G06F 17/5022 703/15 |
| 7,519,747 B1 | 4/2009 | Cory et al. | | |
| 7,624,209 B1 | 11/2009 | Ansari et al. | | |
| 7,831,854 B2 * | 11/2010 | Lai | ....................... | G06F 13/4291 711/103 |
| 7,913,104 B1 | 3/2011 | Cory | | |
| 8,006,068 B1 | 8/2011 | Steiner | | |
| 8,386,828 B1 * | 2/2013 | Ambatipudi | ......... | H03K 21/023 326/96 |
| 8,411,703 B1 * | 4/2013 | Cory | ........................ | G06F 1/10 326/93 |
| 8,654,823 B1 * | 2/2014 | Zhu | ........................ | H03K 23/42 375/219 |
| 9,191,260 B1 * | 11/2015 | Grund | ..................... | H04L 7/042 |
| 9,509,640 B2 * | 11/2016 | Taylor | ....................... | H03L 7/06 |
| 2002/0083354 A1 * | 6/2002 | Adachi | ................... | G06F 1/206 713/322 |
| 2003/0233628 A1 * | 12/2003 | Rana | ................... | G06F 17/5045 716/103 |
| 2007/0234100 A1 * | 10/2007 | Baker | ................... | G06F 1/3203 713/600 |
| 2008/0010479 A1 * | 1/2008 | Fortin | ...................... | G06F 1/12 713/401 |
| 2017/0193136 A1 * | 7/2017 | Prasad | ................... | G06F 17/505 |

* cited by examiner

*Primary Examiner* — Phallaka Kik
(74) *Attorney, Agent, or Firm* — Kevin T. Cuenot

(57) ABSTRACT

Reducing latency of a circuit design can include determining, using a processor, a set of sequential circuit elements of a circuit design that meets a condition for removal from the circuit design, wherein the condition is dependent upon a target technology process and a target operating frequency. Using the processor, a feasible cut for a selected sequential circuit element of the set is determined. The selected sequential circuit element and each other sequential circuit element of the set that is part of the cut is removed from the circuit design using the processor.

20 Claims, 4 Drawing Sheets

US 10,289,786 B1

CIRCUIT DESIGN TRANSFORMATION FOR AUTOMATIC LATENCY REDUCTION

TECHNICAL FIELD

This disclosure relates to integrated circuits (ICs) and, more particularly, to automatically reducing latency in circuit designs for ICs.

BACKGROUND

Each new generation of integrated circuit (IC) continues to provide greater processing performance than the generation before. Part of the increase in performance is due to the reduction in geometries of semiconductor devices. In general, smaller semiconductor devices operate faster than larger semiconductor devices. Further, reduction in semiconductor device size reduces interconnect delays within the IC. As an illustrative example, a circuit design running at a certain frequency on an IC fabricated using a 28 nm technology process is able to operate faster, e.g., at a higher clock frequency, on an IC fabricated using a 16 nm technology process and even faster on an IC fabricated using a 7 nm technology process.

To implement a circuit design using a target IC fabricated using a different technology process, circuit designers are tasked with manually changing the micro-architecture of the circuit design to better operate on the target IC. Adjusting the micro-architecture of the circuit design is a time-consuming and burdensome process.

SUMMARY

One or more embodiments are directed to methods for reducing latency of a circuit design. In one aspect, a method can include determining, using a processor, a set of sequential circuit elements of a circuit design that meets a condition for removal from the circuit design, wherein the condition is dependent upon a target technology process and a target operating frequency. The method can include determining, using the processor, a feasible cut for a selected sequential circuit element of the set and, using the processor, removing, from the circuit design, the selected sequential circuit element and each other sequential circuit element of the set that is part of the cut.

One or more embodiments are directed to systems for reducing latency of a circuit design. In one aspect, a system includes a memory configured to store program code and a processor coupled to the memory. The processor, in response to executing the program code, is configured to initiate operations. The operations include determining a set of sequential circuit elements of a circuit design that meets a condition for removal from the circuit design, wherein the condition is dependent upon a target technology process and a target operating frequency. The operations can include determining a feasible cut for a selected sequential circuit element of the set and removing, from the circuit design, the selected sequential circuit element and each other sequential circuit element of the set that is part of the cut.

One or more embodiments are directed to computer program products for reducing latency of a circuit design. In one aspect, a computer program product includes a computer readable storage medium having program code stored thereon. The program code is executable by a processor to perform operations including determining a set of sequential circuit elements of a circuit design that meets a condition for removal from the circuit design, wherein the condition is dependent upon a target technology process and a target operating frequency. The operations can include determining a feasible cut for a selected sequential circuit element of the set and removing, from the circuit design, the selected sequential circuit element and each other sequential circuit element of the set that is part of the cut.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
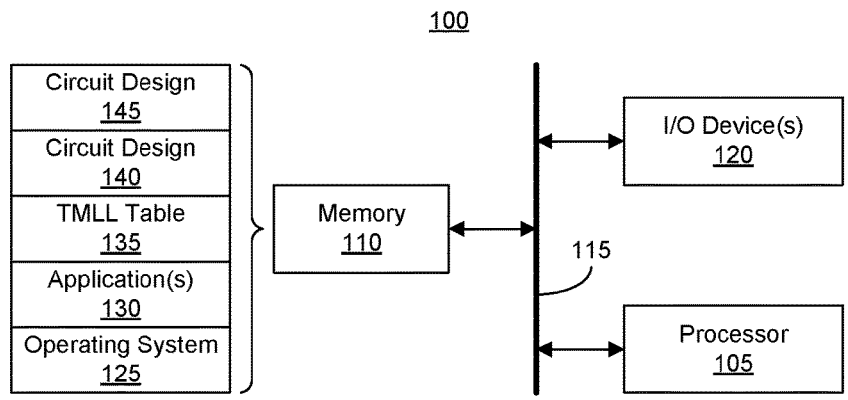
FIG. 1 illustrates an example of a data processing system for use with one or more embodiments described herein.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to automatically reducing latency in circuit designs for ICs. One or more embodiments described within this disclosure relate to adapting circuit designs for implementation in different technology processes and/or adapting circuit designs for operating at different clock frequencies. For example, a circuit design may be adapted for implementation using a first technology process and operating at a first operating (e.g., clock) frequency. A system is capable of transforming the circuit design for implementation using a second and different technology process and/or operating at a second and different operating frequency.

In one or more embodiments, the system is capable of storing a table specifying theoretical maximum logic levels (TMLL). The table stores TMLLs for different technology processes across different operating frequencies. The system is capable of receiving a circuit design and analyzing the circuit design for implementation using a target technology process and a target operating frequency. The system is capable of analyzing the circuit design to determine the amount of latency that can be removed or reduced from the circuit design. The system is capable of removing latency by selectively removing sequential circuit elements from the circuit design. The system is capable of performing the latency reduction techniques automatically. The system is further capable of rebalancing signal paths when implementing the circuit design for the target technology process and/or the target operating frequency.

In one or more embodiments, the system is capable of determining redundant pipeline stages in a circuit design. The system is capable of removing the redundant pipeline stages to meet timing objectives for the second technology process and/or the second operating frequency. By removing redundant pipeline stages, the system is also capable of removing redundant sequential objects from the circuit design thereby reducing power consumption and area usage of the circuit design.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a data processing system (system) 100 for use with one or more embodiments described herein. In an aspect, system 100 is implemented as a computer or other system or device that is suitable for storing and/or executing program code.

System 100 includes at least one processor 105. Processor 105 is coupled to memory 110 through interface circuitry 115. System 100 stores computer readable instructions (also referred to as "program code") within memory 110. Memory 110 is an example of computer readable storage media. Processor 105 executes the program code accessed from memory 110 via interface circuitry 115.

Memory 110 includes one or more physical memory devices such as, for example, a local memory and one or more bulk storage devices. The term "local memory" refers to random access memory (RAM) or other non-persistent memory device(s) generally used during actual execution of the program code. The term "bulk storage device" refers to persistent data storage devices. Examples of a bulk storage device include a hard disk drive (HDD) and a solid state drive (SSD). System 100 may also include one or more cache memories (not shown) that provide temporary storage of at least some program code to reduce the number of times program code must be retrieved from a bulk storage device during execution.

Examples of interface circuitry 115 include, but are not limited to, an input/output (I/O) subsystem, an I/O interface, a bus system, and a memory interface. For example, interface circuitry 115 may be one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

System 100 further may include one or more input/output (I/O) devices 120 coupled to interface circuitry 115. I/O devices 120 may be coupled to system 100, e.g., interface circuitry 115, either directly or through intervening I/O controllers. Examples of I/O devices 120 include, but are not limited to, a keyboard, a display device, a pointing device, one or more communication ports, a network adapter, etc. A network adapter refers to circuitry that enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

Memory 110 stores one or more program modules. The program modules may generally include routines, programs, objects, components, logic, data structures, and so on. For purposes of illustration, memory 110 stores an operating system 125, one or more application(s) 130, and a TMLL table 135. Memory 110 may also store a circuit design 140. Circuit design 140 may be for implementation within a programmable IC (e.g., a field programmable gate array or "FPGA" or other suitable programmable IC), an application specific IC (ASIC), or other suitable IC. In one or more embodiments, application(s) 130 include an EDA application. In an aspect, the EDA application is capable of performing a design flow on circuit design 140 including synthesis, placement, routing, and/or bitstream generation. The EDA application is further capable of performing automatic latency reduction as described herein in greater detail.

In one or more embodiments, processor 105, in executing application 130, is capable of transforming circuit design 140 into circuit design 145. Circuit design 140 and circuit design 145 may be specified as register transfer level (RTL) descriptions, netlists, or in other suitable formats. Processor 105 is capable of automatically evaluating and/or changing the architecture of circuit design 140 by selectively removing sequential circuit elements and/or rebalancing (e.g., retiming) signal paths to generate circuit design 145. Circuit design 145 is functionally equivalent to circuit design 140. Circuit design 145 is modified for implementation in a different process technology than circuit design 140, to operate at a different frequency than circuit design 140, or both. In one or more embodiments, circuit design 145 has less or reduced latency than circuit design 140.

In one or more embodiments, system 100 utilizes TMLL table 135 to perform the transformation of circuit design 140. TMLL table 135 specifies conditions that may be used in determining which sequential circuit elements of circuit design 140 are candidates for removal from circuit design 140. The conditions are specific to the particular process technology of the target IC (e.g., the "target technology process") and/or the particular operating frequency of the target IC (e.g., the "target operating frequency"). For a given technology process and operating frequency, a signal is able to propagate through a path starting with a first sequential circuit element, through one or more logic levels of combinatorial circuitry, to the end of the path formed by a next or second sequential circuit element. The maximum number of logic levels that may be traversed by the signal through the path without violating timing constraints is the TMLL for the target technology process and target operating frequency.

As defined herein, the term "path," in the context of a circuit design, means a connection, e.g., wires and/or circuitry configured to physically convey signals, between at least two endpoints. Each endpoint of the path is a synchronous, or clocked, circuit element. One or more combinatorial, or un-clocked, circuit elements may be in the path. In an example embodiment, sequential circuit elements are synchronous circuit elements.

Table 1 below illustrates an example implementation of TMLL 135.

TABLE 1

| Target Operating Frequency | Target Technology Process | Theoretical Maximum Logic Levels (TMLL) |
| --- | --- | --- |
| 300 MHz | 28 nm | 6 |
| 400 MHz | 28 nm | 5 |
| 500 MHz | 28 nm | 4 |
| 300 MHz | 20 nm | 7 |
| 400 MHz | 20 nm | 6 |
| 500 MHz | 20 nm | 5 |

Table 1 illustrates different TMLLs for different technology processes and for different operating frequencies for each of the different technology processes shown. System 100 is capable of analyzing circuit design 140 and selecting sequential circuit elements that meet a condition for removal as determined using TMLL table 135.

In one or more embodiments, the condition for removing a sequential circuit element from circuit design 140 depends upon a number of logic levels of an input path of the sequential circuit element and on a number of logic levels of an output path of the sequential circuit element. For example, for a given sequential circuit element, the system is capable of determining whether a sum of the number of logic levels of an input path of the given sequential circuit element and the number of logic levels of an output path of the given sequential circuit element is less than or equal to the TMLL for the target technology process and the target operating frequency. If so, the sequential circuit element is added to a set of sequential circuit elements that are evaluated for removal from circuit design 140 to generate circuit design 145.

In one or more embodiments, the data within TMLL 135 is determined from testing of actual ICs implemented using different process technologies operating at different operating frequencies. In one or more embodiments, the data within TMLL 135 is generated from simulation of a circuit design for different technology processes and for different operating frequencies.

In an aspect, operating system 125 and application(s) 130, being implemented in the form of executable program code, are executed by system 100 and, more particularly, by processor 105, to perform the operations described within this disclosure. As such, operating system 125 and application(s) 130 may be considered an integrated part of system 100. Further, it should be appreciated that any data used, generated, and/or operated upon by system 100 (e.g., processor 105) are functional data structures that impart functionality when employed as part of the system.

System 100 may include fewer components than shown or additional components not illustrated in FIG. 1 depending upon the particular type of device and/or system that is implemented. In addition, the particular operating system and/or application(s) included may vary according to device and/or system type as may the types of I/O devices included. Further, one or more of the illustrative components may be incorporated into, or otherwise form a portion of, another component. For example, a processor may include at least some memory.

Figure 2:
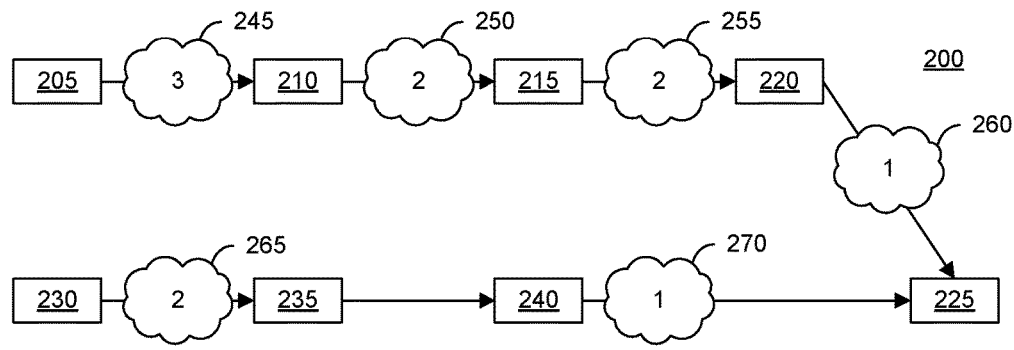
FIG. 2 illustrates an example circuit design.

FIGS. 2-7 illustrate an example circuit design 200 and various states thereof as the system performs the transformations described herein. FIG. 2 illustrates example circuit design 200. In the example of FIG. 2, circuit design 200 includes sequential circuit elements 205, 210, 215, 220, 225, 230, 235, and 240. Circuit design 200 further includes combinatorial circuitry 245, 250, 255, 260, 265, and 270. Within each block or "cloud" representing combinatorial circuitry, the number inside specifies the number of logic levels included therein. For example, combinatorial circuitry 245 includes 3 logic levels. Combinatorial circuitry 250 includes 2 logic levels.

In one or more embodiments, a logic level is particular type of circuit element. For example, a logic level may be a gate. In another example, a logic level may be a look-up table or other suitable circuit element. The number of logic levels specifies the number of circuit elements (e.g., unclocked circuit elements) through which a signal must pass to move from one sequential circuit element to another sequential circuit element of a path. Thus, referring to the path formed of sequential circuit element 205, combinatorial circuitry 245, and sequential circuit element 210, a signal moving from sequential circuit element 205 to sequential circuit element 210 passes through 3 logic levels, e.g., the equivalent of moving through 3 serially connected circuit elements such as logic gates or look-up tables. It should be appreciated that the combinatorial circuitry may be more complex than including only the enumerated number of circuit elements coupled in serial. For example, combinatorial circuitry may include multiple different circuit elements in parallel and/or receive one or more additional signals from other portions of circuitry for processing.

Referring again to FIG. 2, the system is capable of analyzing circuit design 200. The system determines which of sequential circuit elements of circuit design 200 meet the condition for removal. In one or more embodiments, the system does not evaluate sequential circuit elements that are inputs or outputs of circuit design 200. Thus, in the example of FIG. 2, the system does not evaluate whether input sequential circuit elements 205 and 230 or output sequential circuit element 225 meets the condition for removal.

As an illustrative example, the system evaluates sequential circuit element 210. The number of logic levels of the input path of sequential circuit element 210 is 3. The number of logic levels of the output path of sequential circuit element 210 is 2. The sum of the number of logic levels of the input path of sequential circuit element 210 and the number of logic levels of the output path of sequential circuit element 210 is 5. For purposes of illustration, the target operating frequency is 500 MHz and the target process technology is 28 nm. As such, the TMLL is 4 using the example of Table 1. Since 5 is greater than the TMLL of 4, sequential circuit element 210 does not meet the condition for removal.

As another illustrative example, the system evaluates sequential circuit element 215. The number of logic levels of the input path of sequential circuit element 215 is 2. The number of logic levels of the output path of sequential circuit element 215 is 2. The sum of the number of logic levels of the input path of sequential circuit element 215 and the number of logic levels of the output path of sequential circuit element 215 is 4. Since 4 is less than or equal to the TMLL of 4, sequential circuit element 215 does meet the condition for removal. Accordingly, sequential circuit element 215 is added to a set of sequential circuit elements to be processed for removal.

The system is capable of evaluating the remainder of sequential circuit elements 220, 235, and 240 as described above. After completing the analysis, the system determines that the set of sequential circuit elements that meet the condition for removal and that are to be further evaluated includes sequential circuit elements 215, 220, 235, and 240. The system forms a set including the sequential circuit elements that meet the condition for removal.

In one or more embodiments, the system begins operating on sequential circuit elements of the set from the output (e.g., sequential circuit element 225) backward toward the inputs of circuit design 200. Thus, in the example of FIG. 2, the system may select sequential circuit element 220 for processing. The system is capable of making a cut for sequential circuit element 220. The system removes the selected sequential circuit element, e.g., sequential circuit elements 220, and any other sequential circuit element of the cut. In this example, the system also removes sequential circuit elements 240.

Figure 3:
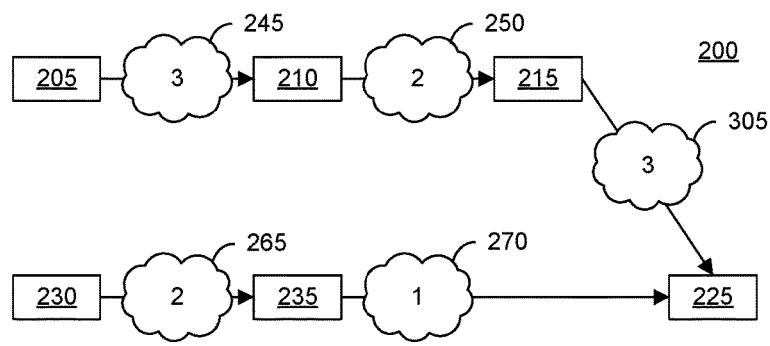
FIG. 3 illustrates an example state of the circuit design of FIG. 2 subsequent to removing sequential circuit elements.

FIG. 3 illustrates an example state of circuit design 200 subsequent to removing sequential circuit elements. In the example of FIG. 3, the system has removed sequential circuit elements 220 and 240 from circuit design 200. Further, sequential circuit elements 220 and 240 are removed from the set of sequential circuit elements being considered for removal from circuit design 200. Sequential circuit elements 205, 210, 215, 225, 230, and 235 remain in circuit design 200. Further, combinatorial circuitry 245, 250, 265, and 270 remains unchanged in circuit design 200. Since sequential circuit element 220 is removed, combinatorial circuitry 255 and combinatorial circuitry 260 is combined to create combinatorial circuitry 305. The set of sequential circuit elements considered for removal from circuit design 200 still includes sequential circuit elements 215 and 235.

Figure 4:
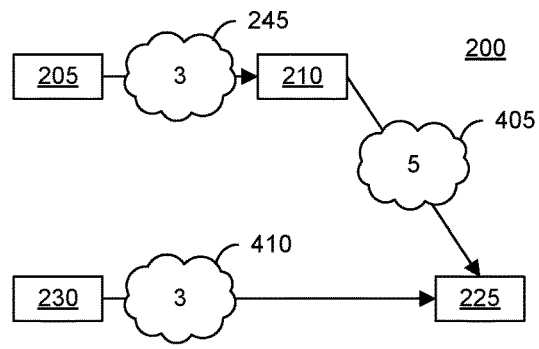
FIG. 4 illustrates another example state of the circuit design of FIG. 2 subsequent to removing further sequential circuit elements.

FIG. 4 illustrates another example state of circuit design 200 subsequent to removing further sequential circuit elements. In the example of FIG. 4, the system has made another cut and removed sequential circuit elements 215 and 235 from circuit design 200. Sequential circuit elements 205, 210, 230, and 225 remain in circuit design 200. Further, combinatorial circuitry 245 remains unchanged in circuit design 200. Due to the removal of sequential circuit element 215 from circuit design 200, the system has combined combinatorial circuitry 250 and combinatorial circuitry 305 to generate combinatorial circuitry 405. Further, due to the removal of sequential circuit element 235 from circuit design 200, the system has combined combinatorial circuitry 265 and combinatorial circuitry 270 to generate combinatorial circuitry 410.

In the example of FIG. 4, the system determines that the resulting number of logic levels of combinatorial circuitry 405, which is 5, exceeds the TMLL of 4. As such, the system determines that the architecture illustrated in FIG. 4 is not legal. In one or more embodiments, the system determines whether a retiming option is enabled. If not, the system reverts to the architecture or state of circuit design 200 shown in FIG. 3 and discontinues processing circuit design 200. For example, the system may output the architecture of circuit design 200 shown in FIG. 3 as circuit design 145.

In response to determining that retiming is enabled, the system is capable of reverting to the architecture illustrated in FIG. 3 to continue processing circuit design 200. In one or more embodiments, retiming may be enabled or disabled based upon user specified preferences in the system. While retiming may allow the system to further process a circuit design to further reduce latency, power consumption, and/or area usage of the circuit design when implemented in an IC, retiming may be computing resource intensive. As such, retiming may consume more time than is available and, as such, be deactivated.

Figure 5:
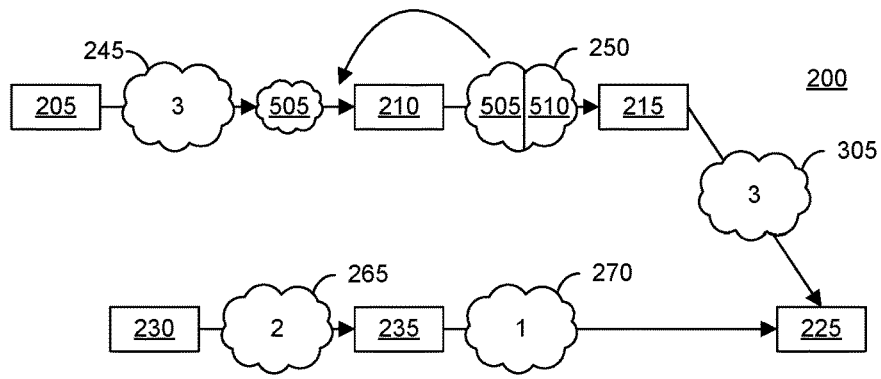
FIG. 5 illustrates an example retiming operation performed on the circuit design of FIG. 2.

FIG. 5 illustrates an example retiming operation performed on circuit design 200. FIG. 5 illustrates the state of circuit design 200 from FIG. 3 after being restored from the example of FIG. 4. In this state, combinatorial circuitry 250 includes two logic levels 505 and 510. In this example, the system moves logic level 505 to the adjacent path formed of sequential circuit element 205 and sequential circuit element 210. For example, the system may append logic level 505 to the end of combinatorial circuitry 245 so that logic level 505 is in the signal path formed of sequential circuit element 205 and sequential circuit element 210. Logic level 505, once relocated, is immediately prior to sequential circuit element 210.

Figure 6:
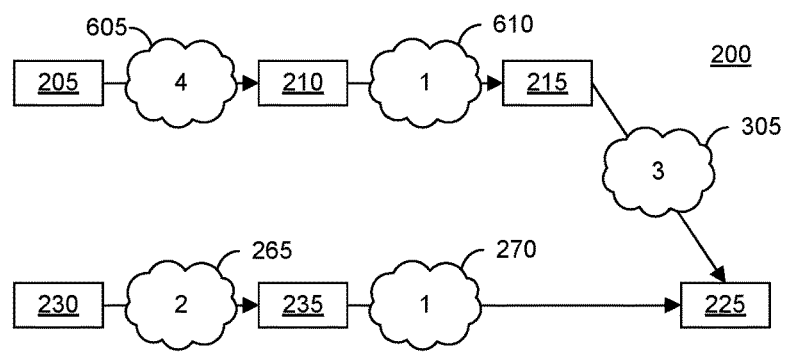
FIG. 6 illustrates an example state of the circuit design of FIG. 2 subsequent to the retiming operation of FIG. 5.

FIG. 6 illustrates an example state of circuit design 200 subsequent to the example retiming operation illustrated of FIG. 5. As pictured, combinatorial circuitry 245, by appending logic level 505, is shown as combinatorial circuitry 605 and includes 4 logic levels instead of 3. Combinatorial circuitry 250, by removing logic level 505, is shown as combinatorial circuitry 610 and includes 1 logic level instead of 2.

Figure 7:
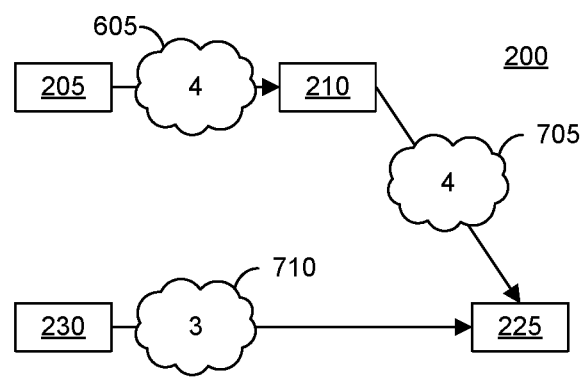
FIG. 7 illustrates an example state of the circuit design of FIG. 2 subsequent to removing further sequential circuit elements after retiming.

FIG. 7 illustrates an example state of circuit design 200 subsequent to removing further sequential circuit elements after the retiming operation illustrated in FIGS. 5 and 6. In the example of FIG. 7, the system has removed the remaining sequential circuit elements 215 and 235 of the set from circuit design 200. The system also removes sequential circuit elements 215 and 235 from the set of sequential circuit elements to be processed. Sequential circuit elements 205, 210, 230, and 225 remain in circuit design 200. Combinatorial circuitry 605 remains in the circuit design. Due to the removal of sequential circuit element 215 from circuit design 200, the system has combined combinatorial circuitry 610 and combinatorial circuitry 305 to generate combinatorial circuitry 705. Further, due to the removal of sequential circuit element 235 from circuit design 200, the system has combined combinatorial circuitry 265 and combinatorial circuitry 270 to generate combinatorial circuitry 710.

In the example of FIG. 7, each of combinatorial circuitries 605, 705, and 710 has a number of logic levels that is less than or equal to the TMLL of 4 for the target technology process and the target operating frequency of the target IC. The retiming operations illustrated in FIGS. 5 and 6 have allowed the system to remove further sequential circuit elements from the set of sequential circuit elements thereby further reducing latency, power consumption, and/or area usage for circuit design 200. In the example of FIG. 7, the system may discontinue processing since the set of sequential circuit elements to be processed does not include any further sequential circuit elements. The resulting architecture of FIG. 7 may be output as circuit design 145, for example.

Figure 8:
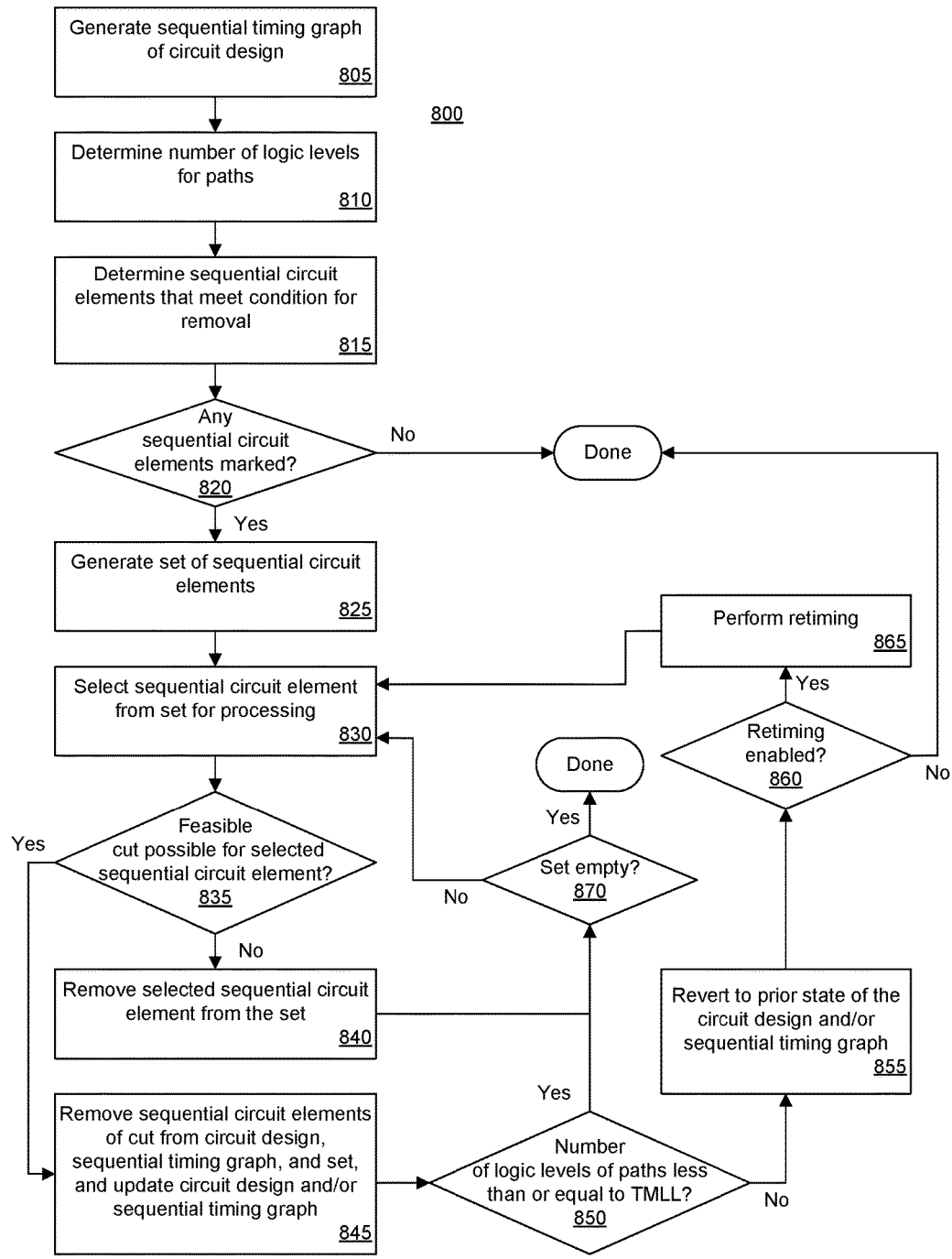
FIG. 8 illustrates an example method of circuit design transformation.

FIG. 8 illustrates an example method 800 of circuit design transformation. Method 800 may be performed by a system such as system 100 of FIG. 1. In one or more embodiments, the system is capable of performing method 800 automatically on a received circuit design. In performing method

800, the system is capable of generating a modified version of the circuit design having reduced latency, that consumes less power, and/or that requires less area for implementation than the original circuit design prior to processing.

For purposes of illustration and discussion, the system has identified a circuit design for processing. Further, a target technology process and a target operating frequency for the circuit design have been specified or otherwise provided to the system. For example, a user may issue one or more commands and/or provide data to specify a circuit design for processing, a target technology process, and a target operating frequency. Given the target technology process and the target operating frequency, the system determines the TMLL from the TMLL table for use in performing method 800.

In block 805, the system is capable of generating a sequential timing graph of the circuit design. For example, during the process of synthesizing the circuit design, the system generates a technology independent representation of the circuit design. The technology independent representation may be a sequential timing graph representing sequential circuit elements and combinatorial circuitry. The sequential elements of the circuit design, for example, have clock pins. As such, each sequential circuit element can be associated with a particular clock domain. Delays for the paths can be added or annotated on the sequential timing graph as well as design constraints such as timing constraints for the paths.

In block 810, the system is capable of determining the number of logic levels for the paths of the circuit design. For example, the system sweeps the circuit design from outputs to the inputs and determines the maximum number of clock cycles that are needed before data reaches to the outputs (and each of the sequential circuit elements represented in the sequential timing graph). The system annotates the sequential timing graph with the number of logic levels for the different paths of the circuit design.

In block 815, the system determines the sequential circuit elements that meet the condition for removal from the circuit design. For example, the system is capable of evaluating each of the sequential circuit elements of the circuit design to determine the number of logic levels of the input path of the sequential circuit element, the number of logic levels of the output path of the sequential circuit element, and whether a sum of the number of logic levels of the input path and the number of logic levels of the output path exceed the TMLL. If so, the system determines that the sequential circuit element meets the condition for removal. The system is capable of marking each sequential circuit element that meets the condition for removal. As discussed, the system need not determine whether input sequential circuit elements or output sequential circuit elements of the circuit design meet the condition for removal.

In block 820, the system determines whether any of the sequential circuit elements of the circuit design have been marked, e.g., meet the condition for removal from the circuit design. If so, method 800 continues to block 825. If not, method 800 ends.

In block 825, the system generates a set of sequential circuit elements that includes each marked sequential circuit element. The set includes each sequential circuit element of the circuit design that meets the condition for removal.

In block 830, the system selects a sequential circuit element from the set for processing. In one or more embodiments, the system sorts the sequential circuit elements in order from output to input. The system selects the sequential circuit element in the set that is closest to the output.

In block 835, the system determines whether a feasible cut is possible for the selected sequential circuit element. As an illustrative and non-limiting example, the system is capable of determining whether a feasible cut exists in a convergent path for the selected sequential circuit element that balances the pipelined stages. A feasible cut of a node "n" (e.g., the selected sequential circuit element) is a set of nodes (sequential circuit elements) in transitive fan-in such that every path from the selected node n to the input nodes (e.g., input sequential circuit elements) is blocked by nodes in the cut. If the system does not determine a feasible cut for the selected sequential circuit element, method 800 continues to block 840. If the system determines a feasible cut for the selected sequential circuit element, method 800 continues to block 845.

In block 840, in the case where the system does not determine a feasible cut, the system is capable of removing the selected sequential circuit element from the set. The selected sequential circuit element remains in the circuit design and/or the sequential timing graph. After block 840, method 800 continues to block 870.

Continuing with block 845, the system is capable of removing the sequential circuit elements of the cut, which include the selected sequential circuit element, from the circuit design. The system is capable of removing the sequential circuit elements of the cut from the sequential timing graph. The system further removes, from the set, each of the sequential circuit elements of the cut that are members of the set.

The system is also capable of updating the circuit design and/or the sequential timing graph. For example, the system is capable of modifying the circuit design and/or sequential timing graph to establish connectivity between circuit elements previously separated by a sequential circuit element of the cut that was removed. It should be appreciated that by establishing connectivity between circuitry previously separated by a sequential circuit element of the cut that has been removed, the system effectively combines combinatorial circuitry that was previously separated by the removed sequential circuit elements. The system is also capable of updating the timing information and the number of logic levels in the resulting combinatorial circuitry for the paths of the circuit design.

In block 850, the system is capable of determining whether the number of logic levels of the paths of the circuit design are less than or equal to the TMLL. For example, the system is capable of checking each of the resulting paths formed as a result of removing a sequential circuit element in block 845 to determine whether the resulting path, e.g., and the resulting combinatorial circuitry, has a number of logic levels that is less than or equal to the TMLL. If each of the paths of the circuit design has a number of logic levels less than or equal to the TMLL, method 800 continues to block 870. If one or more paths of the circuit design have a number of logic level exceeding the TMLL, method 800 continues to block 855.

In block 870, the system determines whether the set is empty. If so, method 800 may end since there are no further sequential circuit elements to process. If not, method 800 may loop back to block 830 to continue processing further sequential circuit elements of the set.

In block 855, the current architecture or state of the circuit design is not legal since at least one path has a number of logic levels exceeding the TMLL. Accordingly, the system reverts the circuit design to the state that existed prior to performance of blocks 835 and 845 for the most recent iteration (e.g., the prior state). After block 855, method 800 continues to block 860.

In block 860, since at least one of the paths of the circuit design had a number of logic levels that exceeded the TMLL prior to block 855, the system determines whether the retiming option is enabled. If so, method 800 continues to block 865. If not, method 800 ends.

In block 865, the system performs retiming. As discussed, the system is capable of moving one or more logic levels of a path to an adjacent path of the circuit design. In one or more embodiments, the system chooses a path on an input side of the previously selected sequential circuit element. The chosen path is referred to as the retiming path. In an aspect, the retiming path may have at least one sequential circuit element that is not a member of the set. The system moves one or more logic levels from the retiming path to an adjacent path (the destination path). The system moves the one or more logic levels, for example, from the retiming path toward the input of the circuit design past the sequential circuit element separating the retiming path from the destination path. The destination path must have a number of logic levels that is less than the TMLL. Subsequent to the movement of the one or more logic levels, the retiming path must have a number of logic levels that is less than the TMLL; and, the destination path must have a number of logic levels that is less than or equal to the TMLL.

Referring to FIG. 5 for purposes of illustration, the system selects the path defined by sequential circuit element 210 (which is not in the set) and sequential circuit element 215 (which is in the set) as the retiming path. The retiming path is the path on the input side of the previously selected sequential circuit element. For example, the previously selected circuit element may have been sequential circuit element 215 (e.g., where removal of sequential circuit element 215 resulted in a path with a number of logic levels exceeding the TMLL). The system moves the one or more logic levels to the destination path which is adjacent to the retiming path and immediately prior to the retiming path. The system is capable of appending the logic levels to combinatorial circuitry 245 of the destination path. It should be appreciated that the retiming operation may only be performed so long as the destination path has a number of logic levels after retiming that is less than or equal to the TMLL.

After block 865, method 800 continues to block 830 to process further sequential circuit elements. In an embodiment, since the system processes sequential circuit elements from output to input, the system selects the sequential circuit element that was selected in the previous iteration of block 830 as the next sequential circuit element to be processed in the current iteration of block 830. In the example of FIG. 8, the system is capable of performing retiming after any iteration that results in a path having a number of logic levels that exceeds the TMLL.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory, as described herein, is an example of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

As defined herein, the term "output" means storing in physical memory, e.g., a device, writing to display or other peripheral output device, sending or transmitting to another system, exporting, or the like.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a graphics processing unit (GPU), a controller, and so forth.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to methods for reducing latency of a circuit design. In one aspect, a method can include determining, using a processor, a set of sequential circuit elements of a circuit design that meets a condition for removal from the circuit design, wherein the condition is dependent upon a target technology process and a target operating frequency. The method can include determining, using the processor, a feasible cut for a selected sequential circuit element of the set and, using the processor, removing, from the circuit design, the selected sequential circuit element and each other sequential circuit element of the set that is part of the cut.

In an aspect, the condition for removal depends upon a number of logic levels of an input path and a number of logic levels of an output path of the sequential circuit elements of the circuit design.

In another aspect, a sum of the number of logic levels of the input path and the number of logic levels of the output path, for each sequential circuit element in the set, is less than or equal to a theoretical maximum logic level for the target technology and the target operating frequency.

In another aspect, determining the set of sequential circuit elements includes determining that a sum of a number of logic levels of an input path and a number of logic levels of an output path of the selected sequential circuit element is less than or equal to a theoretical maximum logic level for the target technology and the target operating frequency.

In another aspect, the method includes, in response to determining that removal of the selected sequential circuit element results in at least one path of the circuit design having a number of logic levels exceeding a theoretical maximum logic level, retiming the circuit design.

In another aspect, the method includes, prior to the retiming, reverting the circuit design to a state prior to removal of the sequential circuit elements of the cut.

In another aspect, the retiming balances logic levels of at least one of an input path or an output path of the selected sequential circuit element.

In another aspect, the retiming includes moving a portion of logic from at least one of an input path or an output path of the selected sequential circuit element to an adjacent path having a number of logic levels that is less than a theoretical maximum logic level for the target technology and the target operating frequency.

One or more embodiments are directed to systems for reducing latency of a circuit design. In one aspect, a system includes a memory configured to store program code and a processor coupled to the memory. The processor, in response to executing the program code, is configured to initiate operations. The operations include determining a set of sequential circuit elements of a circuit design that meets a condition for removal from the circuit design, wherein the condition is dependent upon a target technology process and a target operating frequency. The operations can include determining a feasible cut for a selected sequential circuit element of the set and removing, from the circuit design, the selected sequential circuit element and each other sequential circuit element of the set that is part of the cut.

In an aspect, the condition for removal depends upon a number of logic levels of an input path and a number of logic levels of an output path of the sequential circuit elements of the circuit design.

In another aspect, a sum of the number of logic levels of the input path and the number of logic levels of the output path, for each sequential circuit element in the set, is less than or equal to a theoretical maximum logic level for the target technology and the target operating frequency.

In another aspect, determining the set of sequential circuit elements includes determining that a sum of a number of logic levels of an input path and a number of logic levels of an output path of the selected sequential circuit element is less than or equal to a theoretical maximum logic level for the target technology and the target operating frequency.

In another aspect, the operations include, in response to determining that removal of the selected sequential circuit element results in at least one path of the circuit design having a number of logic levels exceeding a theoretical maximum logic level, retiming the circuit design.

In another aspect, the operations include, prior to the retiming, reverting the circuit design to a state prior to removal of the sequential circuit elements of the cut.

In another aspect, the retiming balances logic levels of at least one of an input path or an output path of the selected sequential circuit element.

In another aspect, the retiming includes moving a portion of logic from at least one of an input path or an output path of the selected sequential circuit element to an adjacent path having a number of logic levels that is less than a theoretical maximum logic level for the target technology and the target operating frequency.

One or more embodiments are directed to computer program products for reducing latency of a circuit design. In one aspect, a computer program product includes a computer readable storage medium having program code stored thereon. The program code is executable by a processor to perform operations including determining a set of sequential circuit elements of a circuit design that meets a condition for removal from the circuit design, wherein the condition is dependent upon a target technology process and a target operating frequency. The operations can include determining a feasible cut for a selected sequential circuit element of the set and removing, from the circuit design, the selected sequential circuit element and each other sequential circuit element of the set that is part of the cut.

In an aspect, the condition for removal depends upon a number of logic levels of an input path and a number of logic levels of an output path of the sequential circuit elements of the circuit design.

In another aspect, a sum of the number of logic levels of the input path and the number of logic levels of the output path, for each sequential circuit element in the set, is less than or equal to a theoretical maximum logic level for the target technology and the target operating frequency.

In another aspect, determining the set of sequential circuit elements includes determining that a sum of a number of logic levels of an input path and a number of logic levels of an output path of the selected sequential circuit element is less than or equal to a theoretical maximum logic level for the target technology and the target operating frequency.

In another aspect, the operations include, in response to determining that removal of the selected sequential circuit element results in at least one path of the circuit design having a number of logic levels exceeding a theoretical maximum logic level, retiming the circuit design.

In another aspect, the operations include, prior to the retiming, reverting the circuit design to a state prior to removal of the sequential circuit elements of the cut.

In another aspect, the retiming balances logic levels of at least one of an input path or an output path of the selected sequential circuit element.

In another aspect, the retiming includes moving a portion of logic from at least one of an input path or an output path of the selected sequential circuit element to an adjacent path having a number of logic levels that is less than a theoretical maximum logic level for the target technology and the target operating frequency.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method for reducing latency of a circuit design, comprising:
   determining, using a processor, a set of sequential circuit elements of a circuit design that meets a condition for removal from the circuit design, wherein the condition is dependent upon a target technology process and a target operating frequency;
   determining, using the processor, a feasible cut for a selected sequential circuit element of the set;
   using the processor, removing, from the circuit design, the selected sequential circuit element and each other sequential circuit element of the set that is part of the cut; and implementing the circuit design within an integrated circuit.

2. The method of claim 1, wherein the condition for removal depends upon a number of logic levels of an input path and a number of logic levels of an output path of the sequential circuit elements of the circuit design.

3. The method of claim 2, wherein a sum of the number of logic levels of the input path and the number of logic levels of the output path, for each sequential circuit element in the set, is less than or equal to a theoretical maximum logic level for the target technology and the target operating frequency.

4. The method of claim 1, wherein the determining the set of sequential circuit elements comprises:
    determining that a sum of a number of logic levels of an input path and a number of logic levels of an output path of the selected sequential circuit element is less than or equal to a theoretical maximum logic level for the target technology and the target operating frequency.

5. The method of claim 1, further comprising:
    in response to determining that removal of the selected sequential circuit element results in at least one path of the circuit design having a number of logic levels exceeding a theoretical maximum logic level, retiming the circuit design.

6. The method of claim 5, further comprising:
    prior to the retiming, reverting the circuit design to a state prior to the removal of the sequential circuit elements of the cut.

7. The method of claim 5, wherein the retiming balances logic levels of at least one of an input path or an output path of the selected sequential circuit element.

8. The method of claim 5, wherein the retiming comprises moving a portion of logic from at least one of an input path or an output path of the selected sequential circuit element to an adjacent path having a number of logic levels that is less than a theoretical maximum logic level for the target technology and the target operating frequency.

9. A system for reducing latency of a circuit design, comprising:
    a memory configured to store program code; and
    a processor coupled to the memory, wherein the processor, in response to executing the program code, is configured to initiate operations including:
        determining a set of sequential circuit elements of a circuit design that meets a condition for removal from the circuit design, wherein the condition is for a target technology process and a target operating frequency;
        determining a feasible cut for a selected sequential circuit element of the set;
        removing, from the circuit design, the selected sequential circuit element and each other sequential circuit element of the set that is part of the cut; and
        implementing the circuit design within an integrated circuit.

10. The system of claim 9, wherein the condition for removal depends upon a number of logic levels of an input path and a number of logic levels of an output path of the sequential circuit elements of the circuit design.

11. The system of claim 10, wherein a sum of the number of logic levels of the input path and the number of logic levels of the output path, for each sequential circuit element in the set, is less than or equal to a theoretical maximum logic level for the target technology and the target operating frequency.

12. The system of claim 9, wherein the determining the set of sequential circuit elements comprises:
    determining that a sum of a number of logic levels of an input path and a number of logic levels of an output path of the selected sequential circuit element is less than or equal to a theoretical maximum logic level for the target technology and the target operating frequency.

13. The system of claim 9, wherein the processor is configured to initiate operations further including:
    in response to determining that removal of the selected sequential circuit element results in at least one path of the circuit design having a number of logic levels exceeding a theoretical maximum logic level, retiming the circuit design.

14. The system of claim 13, wherein the processor is configured to initiate operations further including:
    prior to the retiming, reverting the circuit design to a state prior to the removal of the sequential circuit elements of the cut.

15. The system of claim 13, wherein the retiming balances logic levels of at least one of an input path or an output path of the selected sequential circuit element.

16. The system of claim 13, wherein the retiming comprises moving a portion of logic from at least one of an input path or an output path of the at least one sequential circuit element to an adjacent path having a number of logic levels that is less than a theoretical maximum logic level for the target technology and the target operating frequency.

17. A computer program product comprising a computer readable storage medium having program code stored thereon, the program code executable by a processor to perform operations for reducing latency of a circuit design, comprising:
    determining a set of sequential circuit elements of a circuit design that meets a condition for removal from the circuit design, wherein the condition is for a target technology process and a target operating frequency;
    determining a feasible cut for a selected sequential circuit element of the set;
    removing, from the circuit design, the selected sequential circuit element and each other sequential circuit element of the set that is part of the cut; and
    implementing the circuit design within an integrated circuit.

18. The computer program product of claim 17, wherein the condition for removal depends upon a number of logic levels of an input path and a number of logic levels of an output path of the sequential circuit elements of the circuit design.

19. The computer program product of claim 18, wherein a sum of the number of logic levels of the input path and the number of logic levels of the output path, for each sequential circuit element in the set, is less than or equal to a theoretical maximum logic level for the target technology and the target operating frequency.

20. The computer program product of claim 17, wherein the determining a set of sequential circuit elements comprises:
    determining that a sum of a number of logic levels of an input path and a number of logic levels of an output path of the selected sequential circuit element is less than or equal to a theoretical maximum logic level for the target technology and the target operating frequency.

* * * * *